Oct. 13, 1925.  
C. H. FENNELL  
SHIPPING DEVICE  
Filed April 2, 1925
1,557,449
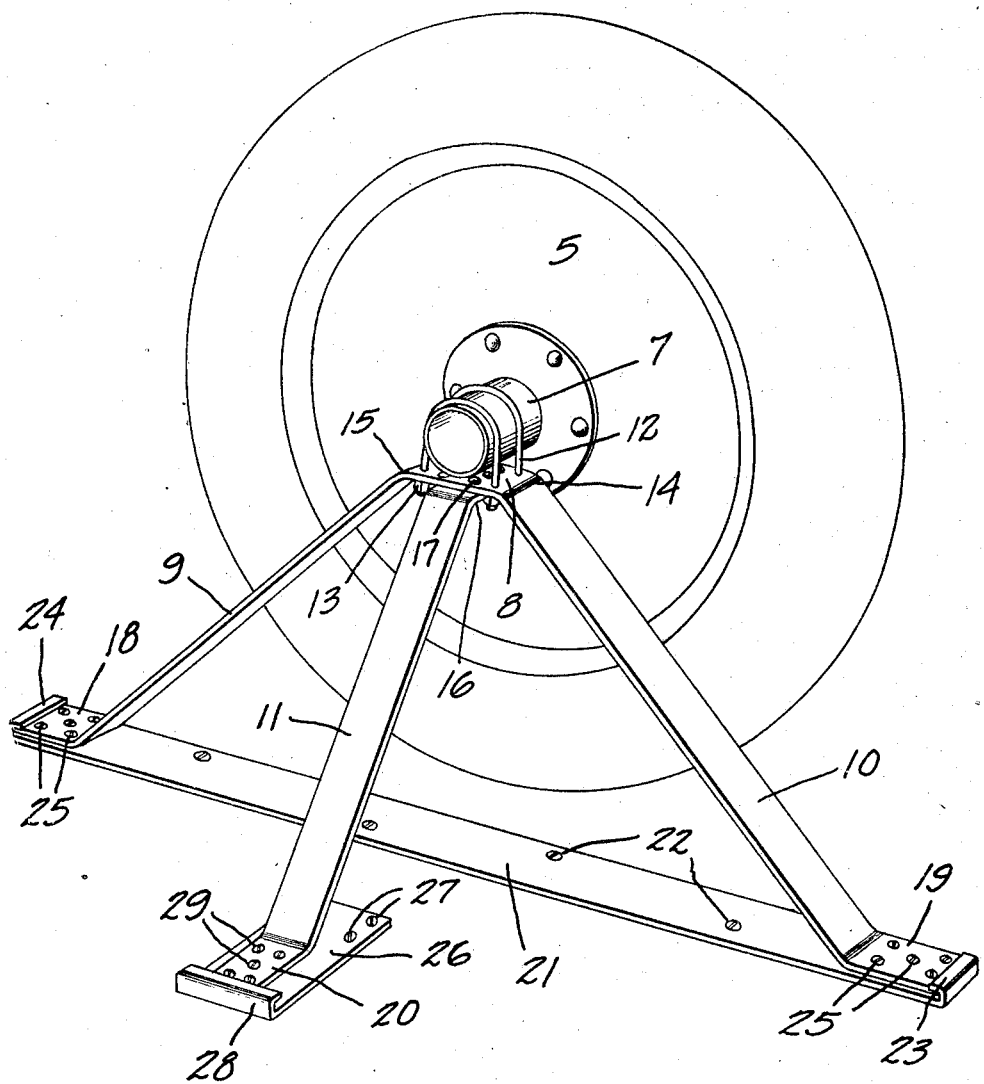
Inventor  
CHARLES H. FENNELL  
By Jking Harness  
Attorney Patented Oct. 13, 1925.

1,557,449

UNITED STATES PATENT OFFICE.

CHARLES H. FENNELL, OF DETROIT, MICHIGAN.

SHIPPING DEVICE.

Application filed April 2, 1925. Serial No. 20,271.

*To all whom it may concern:*

Be it known that I, CHARLES H. FENNELL, a citizen of the United States, and resident of the city of Detroit, county of Wayne, and State of Michigan, have invented certain new and useful Improvements in Shipping Devices, of which the following is a specification, reference being had to the accompanying drawing.

Among the objects of my invention is the provision of floor securing means for shipping devices such as are ordinarily employed in the shipment of automobiles, which will hold the shipping device and consequently the automobile rigidly in place against movement in all directions.

With the above and other objects in view, my invention consists in the arrangement, combination and construction of the various parts of my improved device as described in the specification, claimed in my claims and shown in the accompanying drawing, in which:

The figure is a perspective view showing my improved device attached to an automobile wheel hub.

I have shown an automobile wheel 5 having an elongated ferrule 7 secured on the end of the wheel hub and clamped to the top portion 8 of the supporting legs 9 and 10 by means of U clips 12. The ends of the U clips extend thru the top portion 8 and are secured in place by means of nuts 13 screwed thereon. A third leg 11 is provided extending substantially at right angles to the legs 9 and 10, and having its top end 16 bent under the portion 8 and secured thereto by rivets 17. The legs 9 and 10 are formed from a single strip of metal bent at 14 and 15 to form the top portion 8.

Horizontally bent feet 18, 19 and 20 are provided on the ends of the legs 9, 10 and 11 respectively. A connecting strip 21, adapted to be secured to a floor by means of screws 22, extends between and under the feet 18 and 19. One end of the strip is return bent as at 23 to engage the foot 19 and the other end thereof is return bent as at 24 to engage the foot 18. A plurality of screws 25 secure feet 18 and 19 and their engaging portions of the strip 21 to the floor.

A strip 26 secured to the floor by screws 27, is provided under the foot 20, and has a return bent portion 28 engaging the end of the foot 20. A plurality of screws 29 secure the foot 20 and its engaging portion of the strip 26 to the floor.

It thus will be seen that the strips 21 and 26 provide larger floor engaging surfaces for the legs, and the return bent portions thereof brace the feet on the legs against displacement. The return bent portions 23 and 24 prevent longitudinal displacement of the vehicle and the return bent portion 28 prevents lateral displacement outwardly of the vehicle. In the shipment of an automobile a device such as I have shown would be supplied for each wheel thereof so that the device for the wheel opposite to the wheel 5 will have a similar leg 11 which will be braced by a return bent portion 28 against lateral movement in the direction opposite to that against which the portion 28 acts as a brace.

I have found in practice that my improved device overcomes the tendency of creeping or other displacement such as is particularly likely to happen in tripod shipping devices.

It is obvious that various changes may be made in the arrangement, combination and construction of the various parts of my improved device without departing from the spirit of my invention, and it is my intention to cover by my claims such changes as may be reasonably included within the scope thereof.

What I claim is:

1. A device of the class described comprising a pair of supporting legs, horizontally bent portions on the bottoms of said legs forming feet, a strip extending between said legs and under said feet, the ends of the strip being bent over the ends of the feet, and means for securing said feet and strip to a floor.

2. In combination, a pair of floor attaching strips disposed at angles to each other, one of said strips having both ends return bent and the other strip having one end return bent, a tripod support having feet thereon adapted to overlay portions of said strips, each of said return bent portions engaging one of said feet, and means for attaching said strips and feet to a floor.

CHARLES H. FENNELL.